United States Patent [19]
Barta et al.

[11] Patent Number: 4,611,050
[45] Date of Patent: Sep. 9, 1986

[54] ESSENTIALLY LINEAR POLYMER HAVING A PLURALITY OF AMIDE, IMIDE AND ESTER GROUPS THEREIN, AND A METHOD OF MAKING THE SAME

[75] Inventors: Donald J. Barta, Ossian; George H. Sollner, New Haven, both of Ind.

[73] Assignee: Phelps Dodge Industries, Inc., New York, N.Y.

[21] Appl. No.: 713,282

[22] Filed: Mar. 18, 1985

Related U.S. Application Data

[62] Division of Ser. No. 481,756, Apr. 4, 1983.

[51] Int. Cl.$^4$ .................. C08G 69/44; C08G 73/16
[52] U.S. Cl. ...................... 528/289; 528/296; 528/303; 528/339; 428/174; 428/379
[58] Field of Search ............ 528/289, 296, 303, 339

[56] References Cited

U.S. PATENT DOCUMENTS

| | | | |
|---|---|---|---|
| 3,793,250 | 2/1974 | Schmidt et al. | 528/289 X |
| 4,127,553 | 11/1978 | Osada et al. | 528/289 X |
| 4,141,886 | 2/1979 | Sollner et al. | 528/220 X |
| 4,145,334 | 3/1979 | Schmidt et al. | 528/289 X |
| 4,195,159 | 3/1980 | Kwiecinski | 528/296 X |
| 4,390,686 | 6/1983 | Janssen et al. | 528/289 |
| 4,496,715 | 1/1985 | Sattler | 528/289 X |

*Primary Examiner*—Lucille M. Phynes
*Attorney, Agent, or Firm*—David A. Lundy; Robert L. Walker

[57] ABSTRACT

An essentially linear resin having a plurality of amide, imide and ester groups therein comprising the condensation product of at least one polycarboxylic acid five member ring-forming reactant, at least one ethylenically unsaturated polycarboxylic acid five or six member ring lactam-forming reactant, at least one polyfunctional hydroxy compound, at least one difunctional amino five or six member ring forming reactant, at least one polycarboxylic acid reactant having no more than two carboxylic acid ester forming radicals, and at least one polycarboxylic acid reactant having two or more carboxylic acid ester forming radicals with at least two of the radicals in the 1,2 position relative to each other. The method of forming a solution of a prepolymer having a plurality of amide, imide and ester groups therein in cresylic acid or glycol ether solvents and reacting the same with at least one ethylenically unsaturated polycarboxylic acid five or six member ring forming reactant at elevated temperatures.

19 Claims, No Drawings

ESSENTIALLY LINEAR POLYMER HAVING A PLURALITY OF AMIDE, IMIDE AND ESTER GROUPS THEREIN, AND A METHOD OF MAKING THE SAME

RELATED APPLICATION

This is a divisional application of U.S. patent application Ser. No. 481,756 entitled "ESSENTIALLY LINEAR POLYMER HAVING A PLURALITY OF AMIDE, IMIDE AND ESTER GROUPS THEREIN, A THINNABLE AND SOLDERABLE MAGNET WIRE, AND A METHOD OF MAKING THE SAME" filed on Apr. 4, 1983.

BACKGROUND OF THE INVENTION

This invention relates to a novel resinous polymer and to a solderable or tinnable magnet wire and methods for making the same. More particularly, the invention relates to a class of polymers which have a plurality of amide, imide and ester groups therein which are cross linked utilizing a polyfunctional polycarboxylic acid. Additionally, and more particularly, the invention relates to a tinnable or solderable magnet wire insulated with the novel polymer of the invention which has all of the physical, mechanical, chemical and electrical properties of good magnet wire insulation material while at the same time having the capability of being removed from the electrical conductor of the magnet wire by immersing the magnet wire in a solder bath heated to elevated temperatures.

Magnet wires which are tinnable and solderable are well known. In this application the terms "tinnable" and "solderable" are used synonymously. Both expressions "tinnable" and "solderable" means that when a "tinnable" and "solderable" magnet wire is immersed in a solder bath heated to an elevated temperature, the insulation of the magnet wire is readily destroyed and detached from the conductor of the magnet wire over that portion of the conductor that has been immersed in the bath so that bare wire is exposed and can be directly used for making electrically conductive connections as by soldering. To this end, the magnet wire insulation should be removed as quickly as possible, i.e. in a matter of seconds, following its immersion in the solder bath. The shorter the contact time, the easier it is to remove the insulation and hence to obtain a commercially advantageous procedure. Baths of tin or tin alloys are normally used as the solder bath for this purpose, thus the synonymous use of the words "tinnable" and "solderable". Deinsulation and soldering are carried out in basically the same way in the production of printed circuits and the like.

Prior solderable insulating coatings have been produced on electrical conductors like coating conductors with solutions containing compounds with at least two hydroxyl groups, a portion of which is at least trifunctional or more highly functional and masked by higher functionalized isocyanates. The disadvantage of these known coatings is that they show very little resistance to heat and chemicals; and thus, do not possess the thermal properties desired in many magnet wire applications. Therefore, it would be highly desirable to provide an improved tinnable and solderable magnet wire having an improved thermal stability, while still being "tinnable" and possessing all of the good physical, mechanical, chemical and electrical properties of magnet wire.

On the other hand, essentially linear polyester polymer materials and an essentially linear amide, imide materials have long been available and used as magnet wire, insulation materials. Both thermoplastic and thermosettable essentially linear polyester resin materials have been heretofore proposed. See for example:

| | |
|---|---|
| British Patent No. 978,717 | U.S. Pat. No. 3,293,248 |
| British Patent No. 1,115,919 | U.S. Pat. No. 3,297,785 |
| Canadian Patent No. 706,940 | U.S. Pat. No. 3,312,573 |
| Canadian Patent No. 781,993 | U.S. Pat. No. 3,342,780 |
| French Patent No. 1,416,443 | U.S. Pat. No. 3,382,203 |
| | U.S. Pat. No. 3,390,131 |
| U.S. Pat. No. 2,268,586 | U.S. Pat. No. 3,428,426 |
| U.S. Pat. No. 2,333,639 | U.S. Pat. No. 3,445,477 |
| U.S. Pat. No. 2,686,739 | U.S. Pat. No. 3,446,758 |
| U.S. Pat. No. 2,691,006 | U.S. Pat. No. 3,448,089 |
| U.S. Pat. No. 2,889,304 | U.S. Pat. No. 3,480,589 |
| U.S. Pat. No. 2,936,296 | U.S. Pat. No. 3,489,696 |
| U.S. Pat. No. 3,022,200 | U.S. Pat. No. 3,518,219 |
| U.S. Pat. No. 3,141,859 | U.S. Pat. No. 3,518,230 |
| U.S. Pat. No. 3,179,634 | U.S. Pat. No. 3,553,215 |
| U.S. Pat. No. 3,201,276 | U.S. Pat. No. 3,576,774 |
| U.S. Pat. No. 3,211,585 | U.S. Pat. No. 3,578,639 |
| U.S. Pat. No. 3,240,626 | U.S. Pat. No. 3,699,082 |
| U.S. Pat. No. 3,249,578 | U.S. Pat. No. 3,790,530 |

Numerous polyamide polymers, polyamide-imide polymers and polyimide polymers have also been proposed. These polymers generally have better thermal properties than the polyester polymers, but are appreciably more expensive than the polyester polymers. Thus, while these polymers also have been used as magnet wire enamels, their use has been limited to applications which can tolerate the increased cost thereof. Such polymers have also been disclosed; see for example:

| | |
|---|---|
| British Patent No. 570,858 | U.S. Pat. No. 3,347,828 |
| British Patent No. 627,205 | U.S. Pat. No. 3,445,477 |
| British Patent No. 810,489 | U.S. Pat. No. 3,451,848 |
| British Patent No. 1,009,956 | U.S. Pat. No. 3,471,444 |
| British Patent No. 1,060,159 | U.S. Pat. No. 3,472,815 |
| British Patent No. 1,155,230 | U.S. Pat. No. 3,475,212 |
| British Patent No. 1,160,097 | U.S. Pat. No. 3,485,796 |
| British Patent No. 1,168,978 | U.S. Pat. No. 3,489,696 |
| British Patent No. 1,171,242 | U.S. Pat. No. 3,493,540 |
| British Patent No. 1,175,555 | U.S. Pat. No. 3,509,106 |
| British Patent No. 1,217,041 | U.S. Pat. No. 3,518,219 |
| British Patent No. 1,220,590 | U.S. Pat. No. 3,518,230 |
| British Patent No. 1,234,252 | U.S. Pat. No. 3,539,537 |
| Canadian Patent No. 701,460 | U.S. Pat. No. 3,541,038 |
| French Patent No. 1,473,600 | U.S. Pat. No. 3,546,152 |
| U.S. Pat. No. 2,268,586 | U.S. Pat. No. 3,547,895 |
| U.S. Pat. No. 2,621,168 | U.S. Pat. No. 3,553,159 |
| U.S. Pat. No. 3,179,635 | U.S. Pat. No. 3,554,984 |
| U.S. Pat. No. 3,179,639 | U.S. Pat. No. 3,562,217 |
| U.S. Pat. No. 3,260,691 | U.S. Pat. No. 3,575,891 |
| U.S. Pat. No. 3,300,420 | U.S. Pat. No. 3,578,639 |
| U.S. Pat. No. 3,314,923 | U.S. Pat. No. 3,592,789 |
| | U.S. Pat. No. 3,696,077 |
| | U.S. Pat. No. 3,790,530 |

The demand for new polymers for use as magnet wire insulation materials which have higher and more reliable thermal life, while at the same time, are less expensive to manufacture and to apply than the polyamide, polyamide-imide, and polyimide polymers continues. To meet this demand, there had been proposed several modified polyamide, polyimide and polyester polymer materials. For the most part, these materials are polyamide ester resin materials, polyimide ester resin materials or polyamide-imide-ester resin materials. See for example:

| | |
|---|---|
| British Patent No. 1,242,715 | U.S. Pat. No. 3,425,866 |
| Canadian Pat. No. 771,126 | U.S. Pat. No. 3,426,098 |
| U.S. Pat. No. 2,547,113 | U.S. Pat. No. 3,428,486 |
| U.S. Pat. No. 2,626,223 | U.S. Pat. No. 3,458,480 |
| U.S. Pat. No. 2,777,830 | U.S. Pat. No. 3,493,544 |
| U.S. Pat. No. 2,821,517 | U.S. Pat. No. 3,505,272 |
| U.S. Pat. No. 3,136,738 | U.S. Pat. No. 3,551,383 |
| U.S. Pat. No. 3,255,069 | U.S. Pat. No. 3,555,113 |
| U.S. Pat. No. 3,338,743 | U.S. Pat. No. 3,578,638 |
| U.S. Pat. No. 3,354,126 | U.S., Pat. No. 3,699,082 |
| U.S. Pat. No. 3,361,593 | U.S. Pat. No. 3,793,250 |
| U.S. Pat. No. 3,390,118 | U.S. Pat. No. 3,917,892 |
| | U.S. Pat. No. 3,922,465 |
| | U.S. Pat. No. 3,732,168 |
| | U.S. Pat. No. 3,869,428 |
| | U.S. Pat. No. 4,141,886 |

In general, some such materials are thermoplastic, some are thermosettable materials, some are crosslinked thermoplastic materials and some are crosslinked thermosettable materials. For the most part all such materials contain both aliphatic and aromatic groups. In general, the linear polymers have more flexibility than the non-linear, crosslinked materials, and the totally aromatic polymers have a higher and more reliable thermal life, but are more expensive than the totally aliphatic polymers. Thus, each of the above-identified modified polyamide, polyester, and polyimide polymers represent compromises in thermal life, cost, flexibility, and other physical, mechanical, chemical and electrical properties.

However, the magnet wire industry in general thought that these polyester, polyamide, polyamide-imide, and polyimide polymers could not be used as tinnable and solderable magnet wire insulation materials, because it was not expected that these coatings would be capable of being destroyed quickly enough in a solder bath to make it possible to obtain any commercial useful degree of solderability or tinnability within the parameters discussed hereinabove. In fact, each of the above-identified magnet wire insulation materials applied to conductors by conventional techniques to form magnet wire do not produce a useful tinnable or solderable magnet wire.

The afore-mentioned linear polyester polymers and polyamide, polyamide-imide and polyimide polymers all have suitable physical, mechanical, chemical and electrical properties to be good magnet wire insulation material. However, none of those materials have heretofore been utilized to produce solderable and tinnable magnet wire insulation coating materials. None of these materials have the opposing properties of both the physical, mechanical, chemical and electrical properties of good magnet wire insulation on the one hand, while on the other hand, high thermolability in a solder bath. Because of their good magnet wire insulation properties, however, it would be highly desirable to utilize the afore-mentioned polyester, polyamide, polyamide-imide, polyimide polymers as tinnable or solderable magnet wire insulation materials if the thermal ability in a solder bath be devised.

SUMMARY OF THE INVENTION

It is therefore the primary object of this invention to provide a new magnet wire insulation material which can be used on tinnable or solderable magnet wire, an improved tinnable and solderable magnet wire, and methods of making the same.

Another object of this invention is to provide an improved polymer having a plurality of amide, imide and ester groups therein, an improved tinnable and solderable magnet wire comprising an electrical conductor having a coating of a polymer having a plurality of amide, imide and ester groups therein with all of the physical, mechanical, chemical and electrical properties of good magnet wire insulation, and methods of making the same.

Another object of this invention is to provide an improved polymer having a plurality of amide, imide and ester groups therein which is soluble in well known solvents and which can be applied using conventional magnet wire application machinery, an improved tinnable and solderable magnet wire comprising a conductor having a coating of a polymer having a plurality of amide, imide and ester groups therein with all of the physical, mechanical, chemical and electrical properties of good magnet wire insulation, and methods of making the same.

Another object of the invention is to provide an improved tinnable and solderable magnet wire having higher and more reliable thermal properties and lower cost of use than heretofore possible and methods of making the same.

Another object of this invention is to provide an improved magnet wire insulation material for tinnable and solderable magnet wires, A further object of this invention is to provide an improved magnet wire insulation material for tinnable and solderable magnet wire applications comprising a plurality of amide, imide and ester groups therein which has all of the required mechanical, physical, chemical and electrical properties required for magnet wire applications, improved and more reliable thermal properties which can be applied in an economical and rapid manner and methods of making the same.

Lastly, an object of this invention is to provide an improved magnet wire comprising a conductor and a coating of an essentially linear polymer having a plurality of amide, imide and ester groups therein which has all of the required mechanical, physical, chemical and electrical properties required for most tinnable and solderable magnet wire applications, improved and more reliable thermal properties and which can be applied in an economical and rapid manner, and methods of making the same.

In the broader aspects of this invention there is provided an essentially linear resin having a plurality of amide, imide and ester groups therein comprising the condensation product of at least one polycarboxylic acid five member ring-forming reactant, at least one ethylenically unsaturated polycarboxylic acid five or six member ring lactam-forming reactant, at least one polyfunctional hydroxy compound, at least one difunctional amino five or six member ring forming reactant, and at least one polycarboxylic acid reactant having no more than two carboxylic acid ester forming radicals, and at least one polycarboxylic acid reactant having two or more carboxylic acid ester forming radicals with at least two of the radicals in the 1,2 position relative to each other. The method of forming a solution of a prepolymer having a plurality of amide, imide and ester groups therein and reacting the same with at least one ethylenically unsaturated polycarboxylic acid five or six member ring forming reactant at elevated temperatures. A tinnable and solderable magnet wire having a thin, flexible, tough, thermally stable continuous coating on a conductor which also has a high degree of thermolability in a solder bath.

DESCRIPTION OF A SPECIFIC EMBODIMENT

The polymer of the invention is an essentially linear polymer having a plurality of amide, imide and ester groups therein and has all of the chemical, physical, mechanical and electrical properties of a good insulation material and which can be applied to both copper and aluminum conductors in a more economical and rapid manner and used in tinnable and solderable magnet wire applications.

The improved polymer of the invention is essentially the condensation product of (1) at least one polycarboxylic acid five member ring-forming reactant, (2) at least one ethylenically unsaturated polycarboxylic acid five or six member lactam ring-forming reactant, (3) at least one difunctional amino five or six member ring forming reactant, (4) at least one polyfunctional hydroxy compound, (5) at least one polycarboxylic acid reactant having no more than two carboxylic ester forming radicals therein, and (6) at least one polycarboxylic acid reactant having two or more carboxylic acid ester forming radicals with at least two of the radicals in the 1,2 position relative to each other. These reactants are placed in solution and reacted in the presence of a condensation catalyst in accordance with the method of the invention.

The term "polycarboxylic acid five member ring-forming reactant" is used herein to include those polycarboxylic acid reactants which when reacted with an amine, an isocyanate or other reactive functional group forms a five member imide ring. In general, these carboxylic acid reactants are those which have two adjacent carboxylic acid functional groups and their anhydrides. Both aromatic and aliphatic polycarboxylic acid reactants can be used. Examples of polycarboxylic acid five member ring reactants include: trimellitic acid; pyromellitic acid; benzophenone 2,3,2',3' tetracarboxylic acid; 2,3,6,7, naphthalene tetracarboxylic acid; 3,3',4,4' diphenyl tetracarboxylic acid; and the other known tetracarboxylic acids having two or more benzene nuclei, and the dianhydrides thereof.

The term "ethylenically unsaturated carboxylic acid five or six member lactam ring-forming reactant" is used herein to refer to those unsaturated polycarboxylic acids which upon reaction with an amine will form a five or six member lactam ring. Again, both aromatic and aliphatic acids can be used, however, primarily because of their availability, aliphatic carboxylic acid reactants are preferred. Examples of such ethylenically unsaturated polycarboxylic acid five or six member lactam ring-forming reactants include itaconic and aconitic acids.

The term "difunctional amino five or six member ring-forming reactant" is used herein for those amine compounds which when reated with a polycarboxylic acid five member ring-forming reactant and an ethylenically unsaturated polycarboxylic acid five or six member lactam ring-forming reactant results in the formation of a five member imide ring and a five or six member lactam ring, respectively. The essentially linear diamines are preferred as will be mentioned hereinafter. Both aromatic and aliphatic amino compounds are useful in the invention. Examples of difunctional amino five or six member ring reactants useful in the invention include: methylene dianaline; benzidene; 3,3' diamino diphenyl; 1,4 diamino naphthalene; p-phenylene diamine; $\alpha$, $\omega$-nonamethylene diamine; 4,4' diamino diphenylether; 4,4' dimethyl heptamethylene diamine; 1,7 diamino diphenyl ketone; bis(4-amino phenyl) $\alpha,\alpha'$-p-xylene; m-phenylene diamine; xylene diamine; hexamethylene diamine; ethylene diamine; decacyclohexylmethane diamine; diamino diphenyl sulfone; diamino diphenyl sulfoxide; all diamines having three benzene nuclei; monoethanol amine; monopropanol amine; and the amino carboxylic acids such as glycine, amino proprionic acid, amino caproic acid, amino benzoic acid.

The terms "polyfunctional hydroxyl compound" is used herein to refer to the glycols and both aliphatic and aromatic hydroxyl compounds containing 2 or more hydroxyl groups, for example ethylene glycol; glycerin; pentaerythrytol; 1, 1, 1-trimethylol ethane; 1, 1, 1 trimethylol propane; zorbitol; manitol; dipentaerythitol; and $\alpha$, $\omega$-aliphatic hydrocarbon diols having four to five carbon atoms; cyclic glycols; hydroquinone dibetahydroxy ethyl ether; 1,4-cyclohexane dimethylol; polyethylene glycol; polytetramethylene oxide glycol; and combinations thereof. Examples of the aliphatic diols are 1,4 butane diol; 1,5 pentane glycol; neopenthylene glycol; 1,4-butene-2-diol propylene glycol; and combinations thereof. Examples of the cyclic diols are 2,2,4,4-tetramethyl-1,3-cyclobutane diol, and tris(2hydroxy ethyl) isocyanurate and combinations thereof.

The term "carboxylic acid reactant having two or more carboxylic acid ester forming radicals" is used herein to refer to carboxylic diacids, aryl halides, esters, alkylesters and hydrides thereof.

It is essential that the polymer of the invention have both aromatic and aliphatic groups therein. It is however preferred that the polymer of the invention when used as an insulation material in competition with prior art magnet wire insulations having ester, imide and amide groups therein be predominantly aromatic because of the greater thermostability of the aromatic groups. Inasmuch as the glycol reactant and the ethylenically unsaturated polycarboxylic acid five or six member lactam ring-forming reactant are more readily available as aliphalic reactants, the polycarboxylic acid five member ring-forming reactant, the polyfunctional amino five or six member ring-forming reactant and the other carboxylic acid ester reactants and the polycarboxylic diacid reactants are preferred to be aromatic.

Similarly, inasmuch as the polymer of the invention when used as an insulation material is preferably essentially linear, the difunctional amino five or six member ring-forming reactant is preferrably predominantly linear.

Besides the linearity and the aromaticity or the lack thereof of the specific reactants used, the amounts of the various reactants used to form the polymer of the invention are critical. To achieve a polymer having the desired properties, as above mentioned, various equivalent molar ratios of the functional groups of the reactants must not be exceeded. Also, various minimum equivalent molar rations must be exceeded. The term "equivalent molar ratio" as used herein is calculated in accordance to the following formula:

$$\text{Equivalent molar ratio} = \frac{\text{Moles A} \times \text{functionality of A}}{\text{Moles B} \times \text{functionality of B}}$$

It should be understood that the functional groups in the foregoing reactants are the carboxyl, hydroxyl, amino, and like groups. Therefore, the dicarboxylic acid compounds, the diols and the diamines will be bifunctional, while the functionality of an alcohol having three or more hydroxyl groups will be equal to the particular number of hydroxyl groups in that compound. The carboxyl groups are divided between the "ester-forming", "imide-forming" and "lactam-forming" carboxyl-groups. Each of the reactants above-listed have one or more of these functional groups.

Again, referring to the polymer of the invention used as an insulation material in competition with prior art polymers having ester, imide and amide groups therein, the molar ratio of the functional hydroxyl groups of the hydroxyl compounds to the functional ester-forming carboxyl groups of the acid reactants should be greater than about 1.4 to 1 and less than about 2.5 to 1. The polymer of the invention with a ratio below 1.4 to 1 is difficult to dissolve in cresylic acid, cresylic acid being defined in Bennett's Concise, Chemical and Technical Dictionary (1947), as a mixture of ortho, meta and para-cresols having a boiling range from about 85° C. to about 230° C. Also, ethylene glycol, mono and difunctional ethers, xylol, and minor proportions of petroleum distillates having a boiling range from about 120° C. to about 250° C., and combinations thereof are also useable with the invention. The soluability of the polymer in known solvents is also an important feature of the polymer as used for magnet wire insulation. A ratio above 2.5 to 1 results in a polymer which is too low in molecular weight for desirable magnet wire insulation materials; such a polymer having less than the desired flexibility when applied to magnet wire. Preferably the polymer of the invention used as a tinnable and solderale magnet wire and insulation material has a ratio of about 1.7 to 1.

Similarly, the polymer of the invention desirably has a molar ratio of the functional imide-forming groups of the polycarboxylic acid and the difunctional amino reactants to the functional lactam-forming groups of the ethylenically unsaturated acid and the difunctional amino reactants which is greater than about 0.5 to 1 and less than about 3.0 to 1. A polymer having a ratio below 0.5 to 1 has less than desirable thermal properties as the thermal stability of the five member imide ring is diluted by the lower thermal stability of the other polymer or groups in the polymer. A polymer having a ratio above 3.0 has more plastic flow at elevated temperature; and thus has a lower "cut through" than desired, and the stability of the polymer solution is reduced. Preferably, the polymer invention used as a tinnable and solderable magnet wire insulation material should have a molar ratio of about 2.0 to 1.

Finally, the equivalent molar ratio of the functional ester forming carboxyl groups of the acid reactants to the functional imide-forming groups of the polycarboxylic acid and the difunctional amino reactants and the functional lactam-forming groups of the ethylinically unsaturated acid and the difunctional amino reactants should be greater than about 2.5 to 1 and less than about 5.0 to 1. A polymer having a molar ratio less than about 2.5 to 1 has less flexibility and less "cut through" than desired for a magnet wire insulation material. A polymer having a molar ratio greater than about 5.0 to 1 does not have the required thermal properties of a magnet wire insulation as measured by NEMA "OFM" and "heat shock". Preferably, the polymer invention used as a tinnable and solderable magnet wire insulation material has a ratio of about 3.0 to 1.

The various properties above-mentioned are determined by test procedures standardized by the Magnet Wire Section of the National Electrical Manufactures Association as published in Standards Publication No. MW1000-1981, National Electrical Manufacturers Association (1981).

Both the adherence of the magnet wire insulation to a substrate and the flexibility thereof are measured by a test referred to herein as "snap/snap-flex". This test is conducted in accordance with the procedure in paragraph 2.1, Standards Publication No. MW1000-1981, part 3 (1981).

The thermal properties of the polymer of the invention are tested by tests referred to herein as "heat shock", NEMA "OFM", and "cut through" and "pyrolytic degradation". Each of these tests deal with a different thermal property: "heat shock" is indicative of the ability of the polymer to withstand changes of temperature under stress; NEMA "OFM" is indicative of the resistance to thermal overloads of the polymer at a rated temperature; and "cut through" is indicative of the degree of plasticity of the polymer at elevated temperatures.

The test procedure for: "heat shock " is found in paragraph 4,1; NEMA "OFM" is found in paragraph 53.1; "cut through" is found in paragraph 50.1 of Standards Publication No. MW1000-1981, part 3 (1981).

The electrical properties of the polymer are also tested. The "dielectric breakdown" and "tinnability" as referred to herein is conducted by the test procedures found in paragraphs 7.1 and 3.12, respectively, of Standards Publication No. MW1000-1981, part 3 (1981).

The following examples are presented herein to more fully illustrate the present invention. While specific reactions, reactants, and reaction products are described in these ecamples, it should be understood that each of the above generically identified reactants can be reacted in accordance with the invention disclosed herein to produce a polymer of the invention. Even within the prescribed ratios of reactants listed above, a variety of reactions and reaction products are possible; it being well within the skill of persons skilled in the art to formulate polymers of the invention in accordance therewith.

EXAMPLE I

In the presence of a condensation catalyst, 238.3 grams of ethylene glycol, 62.6 grams of terephthalic acid, 144.7 grams of trimellitic anhydride, were placed in a reactor vessel equipped with a stirrer, a vapor trap and heating equipment. The mass was heated to 200° C. and maintained at that temperature until 36 milliliters of distillate were removed from the trap. 113.1 grams of cresylic acid, 149.2 grams of methylene dianiline, 67.8 grams of itaconic acid and 188.4 grams of trimellitic anhydride were then added to the reaction vessel. The mass was carefully reheated to 210° C. The pressure in the reaction vessel was maintained at atmospheric pressure.

After four hours of reaction at 210° C., the reaction solution was diluted with commercial cresylic acid and a minor portion of an aromatic hydrocarbon diluent resulting in a reaction product comprising approximately 36% weight solids and 64% weight solvent having a cresylic acid to diluent ratio of 60 to 40. The resultant polymer solution was then applied to a bare copper conductor having no insulation thereon employing dies and a conventional wire coating tower at 45 feet per minute having temperatures of 525° F. and 775° F., respectively. Seven coats were applied in this manner. Properties of the resultant magnet wire are shown in Table I.

EXAMPLE II

In presence of a condensation catalyst, 238.3 grams of ethylene glycol, 62.6 grams of terephthalic acid, 333.1 grams of trimellitic anhydride, 113.1 grams of cresylic acid, 67.8 grams of itaconic acid were placed in a reaction vessel equipped with a stirrer, vapor trap, and heating equipment. The mass was heated to 175° C. and maintained at that temperature until 40 milliliters of distillate were removed from the trap. 149.2 grams of methylene dianiline were carefully added to the reaction vessel. The mass was reheated to 210° C. The pressure was maintained at atmospheric pressure. After 3 hours of reaction at 210° C., the solution was diluted with commercial cresylic acid and a minor portion of an aromatic hydrocarbon diluent, resulting in a reaction product consisting of approximately 41% weight solids and 59% weight solvent, the solvent has a cresylic acid to diluent ratio of 60 to 40. The resulting enamel was coated and tested according to the procedures of Example I and shown in Table I.

EXAMPLE III

In the presence of a condensation catalyst, 238.3 grams of ethylene glycol, 62.6 grams of terephthalic acid, 144.7 grams of trimellitic anhydride were placed in a reaction vessel equipped with a stirrer, a vapor trap, and heating equipment. The mass was heated to 200° C. and maintained at that temperature until 36 milliliters of distillate were removed from the trap. 113.0 grams of cresylic acid, 149.2 grams of methylene dianiline and 289.3 grams of trimellitic anhydride were added to the reaction vessel. The solid mass resulting in the kettle was unstirrable for more than 2 hours. The mass was carefully heated to 210° C. The pressure in the reaction vessel was maintained at atmospheric pressure. After 2 hours and 15 minutes at 210° C. the reaction solution was diluted with a commercial cresylic acid, and a minor portion of an aromatic hydrocarbon diluent resulting in a reaction product comprising approximately 43% solids and 57% diluent, the solvent having a cresylic acid to diluent ratio of 60 to 40.

The resulting polymer was applied to a bare copper conductor and tested according to the procedures outline in Example I and shown in Table I.

EXAMPLE IV

In the presence of a condensation catalyst, 223.2 grams of ethylene glycol, 92.0 grams of glycerol, 332.0 grams of terephthalic acid were placed in a reaction vessel equipped with a stirrer, a vapor trap, and heating equipment. The mass was heated to 210° C. and maintained at that temperature until 54 millititers of distillate were removed from the trap. 150.0 grams of cresylic acid, 198.0 grams of methylene dianiline, 90.0 grams of itaconic acid and 250.0 grams of trimellitic anhydride were added to the reaction vessel. The mass was carefully heated to 210° C. The pressure in the reaction vessel was maintained at atmospheric pressure. After 2 hours and 30 minutes of reaction at 210° C., the reaction solution was diluted with commercial cresylic acid and a minor portion of an aromatic hydrocarbon diluent resulting in a reaction product comprising approximately 33% weight solids and 67% weight solvent having a cresylic acid to diluent ratio of 60 to 40. The resulting wire enamel was coated and tested according to the procedures outline in Example I and shown in Table I.

EXAMPLE V 1060.2 grams of an aromatic hydrocarbon diluent, and 219.0 grams of a commercial grade of polyvinyl formal was added to a reaction vessels equipped with a stirrer, reflex condenser and heating equipment. The mass was stirred together. 440.7 grams of phenol and 876.0 grams of a 50% solution of the phenol blocked adduct of 2,4 toluene diisocyanate and trimethylol propane in a commercial cresylic acid solvent were then added to the reaction vessel. The mass was heated to 80° C. until the solution was uniform. The mass was then cooled to below 50° C. 365.1 grams of a commercial grade polyol from Mobil Chemical Company was then added. This enamel was prepared at 25% weight solids and 75% weight solvent at a solvent to diluent ration of 60 to 40. The enamel was applied to 18 AWG copper and tested according to the procedures outlined in Example I and shown in Table I.

EXAMPLE VI 3 grams of a condensation catalyst, 260.0 grams of ethylene glycol, 33.2 grams of terephthalic acid and 192.0 grams of trimellitic anhydride were placed in a reaction vessel equipped with a stirrer, a vapor trap and heating equipment. The mass was heated to 200° C. and maintained at that temperature until 43.5 milliters of distillate were removed from the trap. 150.0 grams of cresylic acid, 79.2 grams of methylene dianiline, 26.0 grams of itaconic acid and 115.3 grams of trimellitic anhydride were added to the reaction vessel. The mass was carefully reheated to 210° C. The pressure in the reaction vessel remained at atmospheric pressure. After 3 hours of reaction at 210 C., the reaction solution was diluted with a commercial cresylic acid resulting in a reaction product at approximately 50% weight solids. 825 grams of this reaction product was added to 2175 grams of a solution of a phenol blocked adduct of 2,4 toluene diisocyanate and trimethylol propane. The resulting enamel was 30% weight solids and 70% weight solvent at a commerical cresylic acid to aromatic hydrocarbon diluent of 60 to 40. The enamel was applied to 18 AWG copper and tested according to the procedures outlined in Example I and shown in Table I.

EXAMPLE VII

In the presence of a condensation catalyst, 108.5 grams of ethylene glycol, 24.9 grams of terephthalic acid, 76.8 grams of trimellitic anhydride, were placed in a reactor vessel equipped with a stirrer, a vapor trap and heating equipment. The mass was heated to 200° C. and maintained at that temperature until 16.2 milliliters of distillate were removed from the trap. 130.0 grams of cresylic acid, 98.0 grams of methylene dianiline, 86.6 grams of itaconic acid and 63.9 grams of trimellitic anhydride were then added to the reaction vessel. The mass was carefully reheated to 210° C. The pressure in the reaction vessel was maintained at atmospheric pressure.

EXAMPLE VIII

In the presence of a condensation catalyst, 217.0 grams of ethylene glycol, 58.1 grams of terephthalic acid, 211.2 grams of trimellitic anhydride, were placed in a reactor vessel equipped with a stirrer, a vapor trap and heating equipment. The mass was heated to 200° C. and maintained at that temperature until 42.3 milliliters of distillate were removed from the trap. 130.0 grams of cresylic acid, 98.0 grams of methylene dianiline, 86.6 grams of itaconic acid and 63.9 grams of trimellitic anhydride were then added to the reaction vessel. The mass was carefully reheated to 210° C. The pressure in the reaction vessel was maintained at atmospheric pressure.

After four hours of reaction at 210° C., the reaction solution was diluted with commercial cresylic acid and a minor portion of an aromatic hydrocarbon diluent resulting in a reaction product comprising approximately 36% weight solids and 64% weight solvent having a cresylic acid to diluent ratio of 60 to 40.

EXAMPLE IX

In the presence of a condensation catalyst, 108.5 grams of ethylene glycol, 24.9 grams of terephthalic acid, 76.8 grams of trimellitic anhydride, were placed in a reactor vessel equipped with a stirrer, a vapor trap and heating equipment. The mass was heated to 200° C. and maintained at that temperature until 16.2 milliliters of distillate were removed from the trap. 130.0 grams of cresylic acid, 98.0 grams of methylene dianiline, 32.5 grams of itaconic acid and 144.0 grams of trimellitic anhydride were then added to the reaction vessel. The mass was carefully reheated to 210° C. The pressure in the reaction vessel was maintained at atmospheric pressure.

After four hours of reaction at 210° C., the reaction solution was diluted with commercial cresylic acid and a minor portion of an aromatic hydrocarbon diluent resulting in a reaction product comprising approximately 36% weight solids and 64% weight solvent having a cresylic acid to diluent ratio of 60 to 40.

EXAMPLE X

In the presence of a condensation catalyst, 217.0 grams of ethylene glycol, 58.1 grams of terephthalic acid, 211.2 grams of trimellitic anhydride, were placed in a reactor vessel equipped with a stirrer, a vapor trap and heating equipment. The mass was heated to 200° C. and maintained at that temperature until 42.3 milliliters of distillate were removed from the trap. 130.0 grams of cresylic acid, 98.0 grams of methylene dianiline, 32.5 grams of itaconic acid and 144.0 grams of trimellitic anhydride were then added to the reaction vessel. The mass was carefully reheated to 210° C. The pressure in the reaction vessel was maintained at atmospheric pressure.

After four hours of reaction at 210° C., the reaction solution was diluted with commercial cresylic acid and a minor portion of an aromatic hydrocarbon diluent resulting in a reaction product comprising approximately 36% weight solids and 64% weight solvent having a cresylic acid to diluent ratio of 60 to 40.

EXAMPLE XI

In the presence of a condensation catalyst, 193.8 grams of ethylene glycol, 24.9 grams of terephthalic acid, 76.8 grams of trimellitic anhydride, were placed in a reactor vessel equipped with a stirrer, a vapor trap and heating equipment. The mass was heated to 200° C. and maintained at that temperature until 16.2 milliliters of distillate were removed from the trap. 130.0 grams of cresylic acid, 98.0 grams of methylene dianiline, 86.6 grams of itaconic acid and 63.9 grams of trimellitic anhydride were then added to the reaction vessel. The mass was carefully reheated to 210° C. The pressure in the reaction vessel was maintained at atmospheric pressure.

After four hours of reaction at 210° C., the reaction solution was diluted with commercial cresylic acid and a minor portion of an aromatic hydrocarbon diluent resulting in a reaction product comprising approximately 36% weight solids and 64% weight solvent having a cresylic acid to diluent ratio of 60 to 40.

EXAMPLE XII

In the presence of a condensation catalyst, 387.5 grams of ethylene glycol, 58.1 grams of terephthalic acid, 211.2 grams of trimellitic anhydride, were placed in a reactor vessel equipped with a stirrer, a vapor trap and heating equipment. The mass was heated to 200° C. and maintained at that temperature until 42.3 milliliters of distillate were removed from the trap. 130.0 grams of cresylic acid, 98.0 grams of methylene dianiline, 86.6 grams of itaconic acid and 63.9 grams of trimellitic anhydride were then added to the reaction vessel. The mass was carefully reheated to 210° C. The pressure in the reaction vessel was maintained at atmospheric pressure.

After four hours of reaction at 210° C., the reaction solution was diluted with commercial cresylic acid and a minor portion of an aromatic hydrocarbon diluent resulting in a reaction product comprising approximately 36% weight solids and 64% weight solvent having a cresylic acid to diluent ratio of 60 to 40.

EXAMPLE XIII

In the presence of a condensation catalyst, 193.8 grams of ethylene glycol, 24.9 grams of terephthalic acid, 76.8 grams of trimellitic anhydride, were placed in a reactor vessel equipped with a stirrer, a vapor trap and heating equipment. The mass was heated to 200° C. and maintained at that temperature until 16.2 milliliters of distillate were removed from the trap. 130.0 grams of cresylic acid, 98.0 grams of methylene dianiline, 32.5 grams of itaconic acid and 144.0 grams of trimellitic anhydride were then added to the reaction vessel. The mass was carefully reheated to 210° C. The pressure in the reaction vessel was maintained at atmospheric pressure.

After four hours of reaction at 210° C., the reaction solution was diluted with commercial cresylic acid and a minor portion of an aromatic hydrocarbon diluent resulting in a reaction product comprising approximately 36% weight solids and 64% weight solvent having a cresylic acid to diluent ratio of 60 to 40.

EXAMPLE XIV

In the presence of a condensation catalyst, 387.5 grams of ethylene glycol, 58.1 grams of terephthalic acid, 211.2 grams of trimellitic anhydride, were placed in a reactor vessel equipped with a stirrer, a vapor trap and heating equipment. The mass was heated to 200° C. and maintained at that temperature until 42.3 milliliters of distillate were removed from the trap. 130.0 grams of cresylic acid, 98.0 grams of methylene dianiline, 32.5 grams of itaconic acid and 144.0 grams of trimellitic anhydride were then added to the reaction vessel. The mass was carefully reheated to 210° C. The pressure in the reaction vessel was maintained at atmospheric pressure.

After four hours of reaction at 210° C., the reaction solution was diluted with commercial cresylic acid and a minor portion of an aromatic hydrocarbon diluent resulting in a reaction product comprising approximately 36% weight solids and 64% weight solvent having a cresylic acid to diluent ratio of 60 to 40.

Examples V and VI disclose resins of the invention and a method of making the same which when applied as magnet wire insulations are tinnable and solderable at temperatures below those solderable at temperatures below those of Examples I through IV. This is accompalished by adding as a reactant a blocked isocyanate which is the reaction product of a polyfunctional isocyanate, a polyfunctional hydroxyl compound, and a compatable monofunctional blocking agent. All of the blocked isocyanates disclosed in U.S. Pat. No. 3,745,138 issued on July 10, 1973 to Koerner et al can be used in the invention and that disclosure is incorporated herein by reference; the only limitation being that the blocked isocyanate must be unblocked as the resin is applied to the conductor in the manufacture of magnet wire if the resin is to be useful as a tinnable and solderable magnet wire insulation material such as disclosed. Thus, the method of manufacturing the magnet wire of the invention and the blocked isocyanate to be used must be chosen accordingly.

In all of the above Examples, the reaction time begins at about 120° C. and can be carried out at reaction temperatures from about 120° C. to about 220° C. at atmospheric pressure.

The polymer of the invention can be utilized as a tinnable and solderable magnet wire enamel and applied to magnet wire to provide an improved tinnable and solderable magnet wire. Magnet wire enamel properly applied has better thermal properties and at the same time all of the required mechanical, physical, chemical and electrical properties required for most of the uses as magnet wire insulation material. The improved polymer has a plurality of amide, imide and ester groups therein and a unique balance by which the thermal properties are enhanced, the flexibility of the polymer is not deteriously affected and none of the physical, mechanical, electrical and chemical properties of conventional polyester, polyamide, and polyimide materials are detracted therefrom. Further, the improved polymer of the invention is soluble in conventional cresylic acid and has the required thermal ability in a solder bath to be useful as a tinnable and solderable magnet wire insulation.

While there have been described above the principles of this invention in connection with specific chemistry it is to be clearly understood that this description is made only by way of example and not as a limitation to the scope of the invention.

TABLE I

| | HEAVY BUILD 18 AWG COPPER MAGNET WIRE RESULTS | | | | | | |
|---|---|---|---|---|---|---|---|
| | Prior Art PDG-357 | Ex. I | Ex. II | Ex. III | Ex. IV | Ex. V | Ex. VI |
| Solids | 28% | 36% | 41% | 43% | 33% | 26.6% | 28.7% |
| Viscosity @ 100° F. | 80 cps | 190 cps | 300 cps | 560 cps | 100 cps | 2,000 cps | 57.5 cps |
| Speed | 45 | 45 | 45 | 45 | 45 | 55 | 55 |
| Build | .0031-33 | .0031-34 | .0032-32 | .0034-35 | .0031-34 | .0029-33 | .0029-30 |
| Elongation | 31% | 35% | 36% | 36% | 35% | 35% | 35% |
| Mandrel Flex | BP 1× OK | BP 1× OK | BP 1× OK | BP 1× OK | BP 1× OK | BP 1× OK | BP 1× OK |
| Snap | OK | OK | OK | OK | OK | OK | OK |
| Snap Flex | 1× OK | 1× OK | 2× OK | 1× OK | 1× OK | 3× OK | 1× OK |
| ½ Hr @ 200° C. 20% 3× | Pass | Pass | Pass | Pass | | | |
| ½ Hr @ 175° C. 20% 3× | | | | | Pass | Fails | Pass |
| Techrand Burnout | 3.1 | 6.3 | 4.7 | 3.7 | | | |
| NEMA Cut Thru °C. | 250 | 302 | 320 | 320 | 219 | 254 | 225 |
| Tinnability | | | | | | | |
| @ 900° F. w/Flux | 7 sec | 3 sec | 6 sec | 3 sec | 7 sec | | |
| @ 750° F. w/Flux | | | | | | 5 sec | 2 sec |

What is claimed is:

1. An essentially linear resin having a plurality of amide, imide and ester groups therein comprising the condensation product of at least one polycarboxylic acid five member ring forming reactant, at least one ethylenically unsaturated polycarboxylic acid five or six member lactam ring forming reactant, at least one difunctional amino five or six member ring forming reactant, at least one polyfunctional hydroxyl compound, at least one polycarxboyxlic acid reactant having no more than two carboxylic acid ester forming radicals, and at least one polycarboxylic acid reactant having two or more carboxylic acid ester forming radicals with at least two of the radicals in the 1,2 position relative to each other, the bonds of said condensation product when cured on a substrate being in part thermolabile in a molten solder bath, thereby having all of the physical, mechanical, chemical and electrical properties of a tinnable and solderable magnet wire insulation material.

2. The resin of claim 1 further comprising as a reactant a blocked isocyanate which is the reaction product of a polyfunctional isocyanate, a polyfunctional hydroxyl compound, and a compatable monofunctional blocking agent.

3. The resin of claim 1 or 2 wherein the molar ratio of the functional hydroxyl groups of said hydroxyl compound to the functional ester forming carboxyl groups of said acid reactants are greater than about 1.4 to 1, the molar ratio of the functional imide-forming groups of said polycarboxylic acid reactants and said difunctional amino reactants to the functional lactam-forming groups of said ethylenically unsaturated acid and difunctional amino reactants are greater than about 0.5 to 1, the molar ratio to said ester-forming groups of said functional imide-forming and lactam-forming groups being greater than about 2.5 to 1.

4. The resin of claim 3 wherein said polycarboxylic acid five member ring forming reactant is chosen from the group consisting of tricarboxylic and tetracarboxylic acids, the anhydrides thereof, and combinations of the same.

5. The resin of claim 3 wherein said polycarboxylic acid five member ring forming reactant is chosen from the group consisting of trimellitic; pyromellitic; 2,3,6,7 naphthalene tetracarboxylic; benzophenone 2,3,2',3' tetracarboxylic; and 3,3',4,4' diphenyl tetracarboxylic acids; the anhydrides of said acids; and combinations thereof.

6. The resin of claim 3 wherein said ethylenically unsaturated reactant is chosen from the group consisting of itaconic and aconitic acid and combinations thereof.

7. The resin of claim 3 wherein said polyfunctional hydroxyl compound is chosen from the group consisting of ethylene glycol; glycerin; pentaerythrytol; 1, 1, 1 trimethylol ethane; 1,1,1 trimethylol propane; zorbitol; manitol; dipentaerythitol; and α, ω aliphatic hydrocarbon diols having four to five carbon atoms; cyclic glycols; hydroquinone dibetahydroxy ethyl ether; 1,4 cyclohexane dimethylol; polyethylene glycol; polytetramethylene oxide glycol; and combinations thereof.

8. The resin of claim 3 wherein said molar ratio of said hydroxyl groups to said ester-forming groups is from about 1.4 to 1 to about 2.5 to 1.

9. The resin of claim 3 wherein said molar ratio of said imide-forming to lactam-forming groups is from about 0.5 to 1 to about 3.0 to 1.

10. The resin of claim 3 wherein said molar ratio of said ester-forming groups to said imide-forming and lactam-forming groups is from about 2.5 to 1 to about 5.0 to 1.

11. The resin of claim 3 comprising essentially of the condensation product of trimellitic acid anhydride, itaconic acid, methylene dianiline, ethylene glycol, phenol-blocked 2, 4 toluene diisocyanate, 1,1,1-trimethylol propane and terephthalic acid.

12. A method comprising the steps of placing in a solvent at least one polyfunctional hydroxyl compound, at least one polycarboxylic acid reactant having no more than two carboxylic acid ester-forming radicals, at least one polycarboxylic acid reactant having two or more carboxylic acid ester forming radicals with at least two of the radicals in the 1,2 position relative to each other, at least one plycarboxylic acid five member ring forming reactant, at least one ethylenically unsaturated polycarboxylic acid five or six member lactam ring forming reactant, at least one difunctional amino five or six member ring forming reactant, thereby forming a reaction solution, reacting said reaction solution and forming a plurality of chemical bonds in the presence of a condensation catalyst, thereby forming a condensation product, said bonds of said condensation product when cured on a substrate being in part thermolabile in a molten solder bath, thereby forming an essentially linear resin having reoccurring amide, imide and ester groups therein and all of the physical, mechanical, chemical, and electrical properties of a tinnable and solderable magnet wire insulation material.

13. The method of claim 12 further comprising as a reactant a blocked isocyanate which is the reaction product of a polyfunctional isocyanate, a polyfunctional hydroxyl compound, and a compatable monofunctional blocking agent.

14. The method of claim 12 or 13 wherein the molar ratio of the functional hydroxyl groups of said hydroxyl compound to the functional ester-forming carboxyl groups of said acid reactants are greater than about 1.4 to 1, the molar ratio of the functional imide-forming groups of said polycarboxylic acid reactants and said difunctional amino reactants to the functional lactam-forming groups of said ethylenically unsaturated acid and difunctional amino reactants are greater than about 0.5 to 1, the molar ratio of said functional ester-forming groups to said functional imide-forming and lactam-forming groups being greater than about 2.5 to 1.

15. The resin of claim 3 or 14 wherein said ratio of said ester-forming groups to said imide-forming and lactam-forming groups is about 3.0 to 1.

16. The resin of claim 3 or 14 wherein said ratio of said hydroxyl groups to said ester-forming groups is about 1.7 to 1.

17. The resin of claim 7, wherein said aliphatic hydrocarbon diols having four to five carbon atoms are chosen from the group consisting of 1,4 butane diol; 1,5 pentane glycol; neopentylene glycol; 1,4-butene-2-diol propylene glycol; and combinations thereof; and wherein said cyclic glycols are chosen from the group consisting of 2,2,4,4 tetramethyl 1,3 cyclobutane diol and tris(2hydroxy ethyl) isocyanurate; and combinations thereof.

18. The method of claim 12 wherein of said reacting step is accomplished at atmospheric pressure and a temperature from about 120° to about 220° C.

19. The resin of claim 3 or 14 wherein said molar ratio of said imide-forming groups to lactam-forming groups is about 2.0 to 1.

* * * * *